United States Patent
Zhang et al.

(10) Patent No.: US 11,251,828 B2
(45) Date of Patent: Feb. 15, 2022

(54) NETWORK ROUTING DEVICE, NETWORK DATA TRANSMISSION METHOD, AND NETWORK ACCESS DEVICE

(71) Applicant: HUAWEI TECHNOLOGIES CO., LTD., Shenzhen (CN)

(72) Inventors: Li Zhang, Wuhan (CN); Jie LV, Wuhan (CN); Yan Zeng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 16/880,891

(22) Filed: May 21, 2020

(65) Prior Publication Data
US 2020/0287586 A1  Sep. 10, 2020

Related U.S. Application Data

(63) Continuation of application No. PCT/CN2018/116065, filed on Nov. 17, 2018.

(30) Foreign Application Priority Data

Nov. 27, 2017 (CN) .......................... 201711204037.6

(51) Int. Cl.
  *H04B 1/48* (2006.01)
  *H04B 3/54* (2006.01)
  (Continued)

(52) U.S. Cl.
  CPC .............. *H04B 1/48* (2013.01); *H04B 3/54* (2013.01); *H04B 7/0413* (2013.01); *H04B 7/0632* (2013.01)

(58) Field of Classification Search
  CPC .......... H04B 1/48; H04B 3/54; H04B 7/0413; H04B 7/0632; H04B 1/40; H04B 1/69;
  (Continued)

(56) References Cited

U.S. PATENT DOCUMENTS 7,149,490 B1 * 12/2006 Gunzelmann ........ H04B 1/0483
  455/313
8,228,849 B2 *  7/2012 Trachewsky .......... H04W 48/20
  370/329

(Continued)

FOREIGN PATENT DOCUMENTS

| CN | 101340345 A | 1/2009 |
| CN | 101873723 A | 10/2010 |

(Continued)

OTHER PUBLICATIONS

Huang Wenzhun et al., Tutorial on modern communication principles, Mar. 2016, 4 pages.

(Continued)

*Primary Examiner* — Lana N Le
(74) *Attorney, Agent, or Firm* — Stein IP, LLC

(57) ABSTRACT

A network routing device, a network data transmission method, and a network access device. The network routing device's first network transmission processing module is configured to convert a received data signal into at least two baseband signals, send one baseband signal to a first radio frequency unit, and send another baseband signal to a first wired communication module. The first radio frequency unit converts the baseband signal into a radio frequency signal and sends the radio frequency signal by using a first antenna, and the first wired communication module converts the baseband signal into a network signal that can be transmitted in a wired transmission medium and sends the network signal to the wired transmission medium for transmission. According to the network routing device, a signal can be transmitted in both a wired manner and a wireless manner. This improves signal transmission reliability.

18 Claims, 5 Drawing Sheets

(51) Int. Cl.
*H04B 7/0413* (2017.01)
*H04B 7/06* (2006.01)

(58) Field of Classification Search
CPC .......... H04B 1/707; H04B 7/04; H04B 7/024; H04W 88/08; H04W 84/12; H04W 40/12; H04W 40/04; H04W 40/06; H04W 88/06; H04W 12/79; H04W 88/02; H04W 88/085; H04W 12/65; H04W 4/80; H04L 25/03

See application file for complete search history.

(56) References Cited

U.S. PATENT DOCUMENTS

| | | | |
|---|---|---|---|
| 10,034,297 B2* | 7/2018 | Gandhi | H04W 12/06 |
| 2005/0221836 A1* | 10/2005 | Vainikka | H04W 88/08 |
| | | | 455/452.2 |
| 2007/0032246 A1* | 2/2007 | Feher | A61B 5/0022 |
| | | | 455/456.1 |
| 2007/0067282 A1 | 3/2007 | Prakash et al. | |
| 2007/0177552 A1* | 8/2007 | Wu | H04W 88/08 |
| | | | 370/335 |
| 2007/0238469 A1* | 10/2007 | Tsukamoto | H04W 88/08 |
| | | | 455/450 |
| 2008/0043970 A1 | 2/2008 | Scholes et al. | |
| 2010/0203919 A1* | 8/2010 | Kelleher | H04B 1/40 |
| | | | 455/550.1 |
| 2016/0086484 A1* | 3/2016 | Feher | H04B 1/707 |
| | | | 375/130 |
| 2016/0295447 A1* | 10/2016 | Braun | H04L 43/16 |
| 2016/0345382 A1 | 11/2016 | Tzou | |
| 2018/0337718 A1* | 11/2018 | Srinivasan | H04B 7/04 |
| 2021/0075562 A1* | 3/2021 | Babich | H04L 25/0305 |

FOREIGN PATENT DOCUMENTS

| | | | |
|---|---|---|---|
| CN | 103685044 A | 3/2014 | |
| CN | 104113935 A | 10/2014 | |
| CN | 104901717 A | 9/2015 | |
| EP | 2709420 A1 | 3/2014 | |
| EP | 2863567 A4 * | 6/2015 | .......... H04B 7/0413 |
| KR | 20170032786 A | 3/2017 | |
| WO | WO-2009089765 A1 * | 7/2009 | ............. H04W 88/08 |

OTHER PUBLICATIONS

IEEE 802.11-12/0610r0 George Calce et al.,"Non-TIM Stations in 11ah",IEEE,dated May 2012,total 11 pages.
IEEE 802.11-12/0843r0 Chittabrata Ghosh et al.,"Restricted Access Window Signaling for Uplink Channel Access",, IEEE,dated Jul. 2012 ,total 13 pages.
IEEE 802.11-12/0867r0 Hyoungjin Kwon et al.,"Non-TIM Allocation",, IEEE,dated Jul. 2012,total 9 pages.

* cited by examiner

NETWORK ROUTING DEVICE, NETWORK DATA TRANSMISSION METHOD, AND NETWORK ACCESS DEVICE

CROSS-REFERENCE TO RELATED APPLICATION

This application is a continuation of International Application No. PCT/CN2018/116065, filed on Nov. 17, 2018, which claims priority to Chinese Patent Application No. 201711204037.6, filed on Nov. 27, 2017. The disclosures of the aforementioned applications are hereby incorporated by reference in their entireties.

TECHNICAL FIELD

The present subject matter relates to the field of communications technologies, and in particular, to a network routing device, a network data transmission method, and a network access device.

BACKGROUND

A wireless local area network (WLAN) is a network that uses wireless channels of various radio waves (such as lasers, infrared rays, and radio frequencies) to replace some or all transmission media of a wired local area network. A most common WLAN system is wireless fidelity (WiFi). Wi-Fi is a wireless local area network that is based on the IEEE 802.11 family of standards to use a high radio frequency (for example, a radio electromagnetic wave of a frequency band such as 2.4 GHz, 5 GHz, or 60 GHz) as a transmission medium.

Wi-Fi is currently the most widely used wireless network transmission technology, and a Wi-Fi router is ubiquitous at home. Typical data services, such as SMS messages and voice calls, do not have high requirements for network bandwidth, a latency, and a packet loss ratio. Therefore, a current home Wi-Fi technology can meet the needs of these services. However, with the rapid growth of communications technologies, the current home Wi-Fi technology can hardly meet the needs of services with high requirements, for example, high bandwidth services such as high-definition videos, 4K videos, and games, due to limitations on performance such as bandwidth and anti-interference.

SUMMARY

This application provides a network routing device, a network data transmission method, and a network access device, and can improve network signal transmission reliability.

According to a first aspect, this application provides a network routing device, where the network routing device includes a first network transmission processing module, at least one first radio frequency unit, a first antenna corresponding to the first radio frequency unit in number, and at least one first wired communication module, where the first network transmission processing module has at least two first baseband signal data interfaces, one first baseband signal data interface is connected to one end of the first radio frequency unit, the other end of the first radio frequency unit is connected to the first antenna, and another first baseband signal data interface is connected to one first wired communication module; the first network transmission processing module is configured to: convert a received data signal into at least two baseband signals, send one baseband signal to the first radio frequency unit through the first baseband signal data interface, and send another baseband signal to the first wired communication module through the first baseband signal data interface; the first radio frequency unit is configured to: convert the baseband signal sent by the first network transmission processing module into a radio frequency signal, and then send the radio frequency signal via the first antenna; and the first wired communication module is configured to: be connected to a wired transmission medium, convert the baseband signal sent by the first network transmission processing module into a network signal that can be transmitted in the wired transmission medium, and then send the network signal to the wired transmission medium for transmission.

In this application, the network routing device may send a signal in both a wireless manner and a wired manner based on the radio frequency unit and the wired communication module. Compared with a routing device that can transmit a signal only in the wireless or wired manner, the network routing device in this application can prevent an overall signal transmission effect from being greatly affected even when channel quality of one of the transmission manners is relatively poor. This improves overall signal transmission reliability, and better meets an actual application requirement.

With reference to the first aspect, in a first implementation of the first aspect, the first radio frequency unit is further configured to: convert a radio frequency signal that is received via the first antenna into a baseband signal, and then send the baseband signal to the first network transmission processing module through the first baseband signal data interface; the first wired communication module is further configured to: convert a network signal from the wired transmission medium into a baseband signal, and then send the baseband signal to the first network transmission processing module through the first baseband signal data interface; and the first network transmission processing module is further configured to: receive the baseband signal sent by the first radio frequency unit, receive the baseband signal sent by the first wired communication module, convert the received at least two baseband signals into a data signal, and then send the data signal.

With reference to the first aspect or the foregoing implementation of the first aspect, in a second implementation of the first aspect, the first wired communication module includes at least one of the following communication modules: a power line communication module, a coaxial cable communication module, a telephone line communication module, a twisted pair communication module, and an optical fiber communication module.

With reference to the first aspect or the foregoing implementations of the first aspect, in a third implementation of the first aspect, the first wired communication module includes a first wired communication analog front-end unit and a first wired medium interface, one end of the first wired communication analog front-end unit is connected to the first baseband signal data interface, and the other end of the first wired communication analog front-end unit is connected to the first wired medium interface; the first wired communication analog front-end unit is configured to: convert the baseband signal sent by the first network transmission processing module into the network signal that can be transmitted in the wired transmission medium, and then send the network signal to the first wired medium interface; and the first wired medium interface is configured to: be connected to the wired transmission medium, and then transmit, to the wired transmission medium, the network signal sent by the first wired communication analog front-end unit.

With reference to the first aspect or the foregoing implementations of the first aspect, in a fourth implementation of the first aspect, the first wired medium interface is further configured to transmit a network signal from the wired transmission medium to the first wired communication analog front-end unit; and the first wired communication analog front-end unit is further configured to: convert the network signal from the first wired medium interface into a baseband signal, and then send the baseband signal to the first network transmission processing module.

With reference to the first aspect or the foregoing implementations of the first aspect, in a fifth implementation of the first aspect, the network routing device further includes a first power interface that is connected to the first network transmission processing module and the first wired communication module; and if the first wired communication module is a power line communication module, the first wired medium interface is connected to a power line of the first power interface.

In this application, the second wired medium interface of the power line communication module is connected to the power line of the power interface. Therefore, when the power interface of the network routing device is connected to an inherent power line system, the network routing device is connected to a power line of the wired transmission medium. In this case, when a network access device is connected to a power system, the network access device is connected to the network routing device. With this solution, cabling complexity can be greatly reduced when the network routing device is connected to the network access device.

With reference to the first aspect or the foregoing implementations of the first aspect, in a sixth implementation of the first aspect, the first power interface is a three-phase power interface, there are two power line communication modules, the first wired medium interface of one of the power line communication modules is connected to a live wire of the power line of the first power interface and an earth wire of the power line of the first power interface, and the first wired medium interface of the other power line communication module is connected to a neutral wire of the power line of the first power interface and the earth wire of the power line of the first power interface.

With reference to the first aspect or the foregoing implementations of the first aspect, in a seventh implementation of the first aspect, the device further includes a first channel indicator detection unit connected to the first network transmission processing module, where the first channel indicator detection unit is configured to: detect a first channel indicator of a wireless channel corresponding to the first radio frequency unit, detect a second channel indicator of a wired channel corresponding to the first wired communication module, and send a detection result to the first network transmission processing module; and the first network transmission processing module is further configured to determine, before converting the received data signal into the at least two baseband signals, that both the first channel indicator and the second channel indicator meet a preset channel indicator condition.

In this application, before performing data signal conversion, the network routing device detects the channel indicator of the wireless channel and the channel indicator of the wired channel. This further ensures signal transmission quality.

With reference to the first aspect or the foregoing implementations of the first aspect, in an eighth implementation of the first aspect, the first network transmission processing module is further configured to: when both the first channel indicator and the second channel indicator do not meet the channel indicator condition, determine, based on the first channel indicator and the second channel indicator, that a signal is sent via the first radio frequency unit or the first wired communication module; and convert the received data signal into a corresponding number of baseband signals based on a determined number of channels corresponding to the first radio frequency unit and then send, to the first radio frequency unit through the first baseband signal data interface, the baseband signals obtained after conversion, or convert the received data signal into a corresponding number of baseband signals based on a determined number of channels corresponding to the first wired communication module and then send, to the first wired communication module through the first baseband signal data interface, the baseband signals obtained after conversion.

With reference to the first aspect or the foregoing implementations of the first aspect, in a ninth implementation of the first aspect, each of the first channel indicator and the second channel indicator includes at least one of the following channel indicators: a packet loss ratio, a signal-to-noise ratio, and external interference intensity and interference duration.

With reference to the first aspect or the foregoing implementations of the first aspect, in a tenth implementation of the first aspect, the first network transmission processing module is specifically configured to: convert a data signal that carries first-type data and that is in the received data signal into at least one baseband signal, convert a data signal that carries second-type data and that is in the received data signal into at least one baseband signal, send a baseband signal corresponding to the first-type data to the first radio frequency unit through the first baseband signal data interface, and send a baseband signal corresponding to the second-type data to the first wired communication module through the first baseband signal data interface.

In this application, baseband signals that carry different types of data may be sent through different channels. This better meets an actual application requirement.

With reference to the first aspect or the foregoing implementations of the first aspect, in an eleventh implementation of the first aspect, the at least two baseband signals converted by the first network transmission processing module from the received data signal are multiple-input multiple-output (MIMO) modulation signals.

According to a second aspect, this application provides a network data transmission method, where the transmission method includes: converting a received data signal into at least two baseband signals; converting one of the at least two baseband signals into a radio frequency signal by using a first radio frequency unit, and then sending the radio frequency signal by using a first antenna; and converting one another baseband signal in the at least two baseband signals into a network signal that can be transmitted in a wired transmission medium, and then sending the network signal to the wired transmission medium for transmission.

With reference to the second aspect, in a first implementation of the second aspect, the transmission method further includes: receiving a radio frequency signal by using the first antenna, and converting the received radio frequency signal into a baseband signal by using the first radio frequency unit; receiving a network signal from the wired transmission medium, and converting the received network signal into a baseband signal; and converting the received at least two baseband signals into a data signal, and then sending the data signal.

With reference to the second aspect or the foregoing implementation of the second aspect, in a second implementation of the second aspect, before the converting a received data signal into at least two baseband signals, the transmission method further includes: detecting a first channel indicator of a wireless channel corresponding to the first radio frequency unit; detecting a second channel indicator of a wired channel corresponding to the wired transmission medium; and determining that both the first channel indicator and the second channel indicator meet a preset channel indicator condition.

With reference to the second aspect or the foregoing implementations of the second aspect, in a third implementation of the second aspect, if both the first channel indicator and the second channel indicator do not meet the preset channel indicator condition, the transmission method further includes: determining, based on the first channel indicator and the second channel indicator, that a signal is sent by using the first radio frequency unit or the wired transmission medium; and converting the received data signal into a corresponding number of baseband signals based on a number of channels corresponding to the first radio frequency unit and then sending, by using the first radio frequency unit, the baseband signals obtained after conversion, or converting the received data signal into a corresponding number of baseband signals based on a number of channels corresponding to the wired transmission medium and then sending, by using the wired transmission medium, the baseband signals obtained after conversion.

With reference to the second aspect or the foregoing implementations of the second aspect, in a fourth implementation of the second aspect, the converting a received data signal into at least two baseband signals includes: converting a data signal that carries first-type data and that is in the received data signal into at least one baseband signal; and converting a data signal that carries second-type data and that is in the received data signal into at least one baseband signal; where the converting one of the at least two baseband signals into a radio frequency signal by using a first radio frequency unit, and then sending the radio frequency signal by using a first antenna includes: converting a baseband signal corresponding to the first-type data into the radio frequency signal by using the first radio frequency unit, and then sending the radio frequency signal by using the first antenna; where the converting another baseband signal in the at least two baseband signals into a network signal that can be transmitted in a wired transmission medium, and then sending the network signal to the wired transmission medium for transmission includes: converting a baseband signal corresponding to the second-type data into the network signal that can be transmitted in the wired transmission medium, and then sending the network signal to the wired transmission medium for transmission.

With reference to a third aspect, this application provides a network access device, where the network access device includes a second network transmission processing module, at least one second radio frequency unit, a second antenna corresponding to the second radio frequency unit in number, and at least one second wired communication module, where the second network transmission processing module has at least two second baseband signal data interfaces, one second baseband signal data interface is connected to one end of the second radio frequency unit, the other end of the second radio frequency unit is connected to the second antenna, and another second baseband signal data interface is connected to the second wired communication module; the second radio frequency unit is configured to: convert a radio frequency signal that is received by using the second antenna into a baseband signal, and then send the baseband signal to the second network transmission processing module through the second baseband signal data interface; the second wired communication module is configured to: be connected to a wired transmission medium, convert a network signal that is received from the wired transmission medium into a baseband signal, and then send the baseband signal to the second network transmission processing module through the second baseband signal data interface; and the second network transmission processing module is configured to: receive, through the second baseband signal data interface, the baseband signal sent by the second radio frequency unit, receive, through the second baseband signal data interface, the baseband signal sent by the second wired communication module, parse the received baseband signals, and then obtain data carried in the baseband signals.

With reference to the third aspect, in a first implementation manner of the third aspect, the second network transmission processing module is further configured to: generate at least two baseband signals based on to-be-sent data, send one baseband signal to the second radio frequency unit through the second baseband signal data interface, and send another baseband signal to the second wired communication module through the second baseband signal data interface; the second radio frequency unit is further configured to: convert the baseband signal sent by the second network transmission processing module into a radio frequency signal, and then send the radio frequency signal by using the second antenna; and the second wired communication module is further configured to: convert the baseband signal sent by the second network transmission processing module into a network signal that can be transmitted in the wired transmission medium, and then send the network signal to the wired transmission medium for transmission.

According to a fourth aspect, this application provides a network transmission system, where the transmission system includes the network routing device in the first aspect or any implementation of the first aspect in this application and at least one network access device, the network access device is a wired network access device or a wireless network access device, the network access device is connected to a first wired communication module of the network routing device by using a wired transmission medium or is wirelessly connected to a first radio frequency module of the network routing device, and the first radio frequency module includes at least one first radio frequency unit and a first antenna corresponding to the first radio frequency unit in number.

In this application, the network access device may access the network routing device in a wired and/or wireless manner based on a network communication mode supported by the device, to provide more options for different network access devices to access a network. This better meets an actual application requirement.

DESCRIPTION OF EMBODIMENTS

Embodiments of the present subject matter provide a network routing device, a network data transmission method, and a network access device, which are applicable to an application scenario in which the network access device may perform data transmission with the network access device by using different transmission media.

Figure 1:
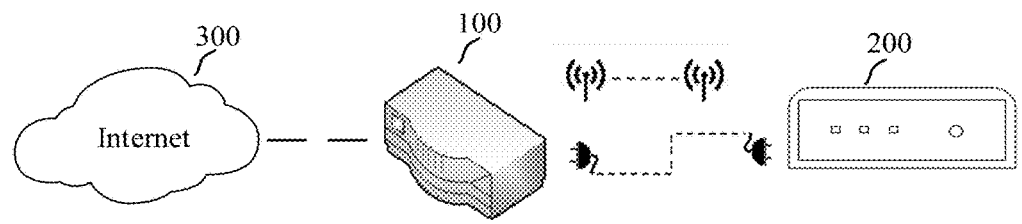
FIG. 1 is a schematic diagram of a network architecture applicable to an embodiment of the present subject matter.

FIG. 1 is a schematic diagram of a network architecture applicable to an embodiment of the present subject matter. As shown in FIG. 1, the network architecture includes a network routing device 100 and a network access device 200. In the network architecture shown in FIG. 1, the network routing device 100 may be specifically implemented as a router, and the network access device 200 may be specifically implemented as an internet protocol television (IPTV) set-top box (STB).

The network routing device 100 accesses Ethernet through a network interface (such as a wide area network interface). The network routing device 100 performs a wireless communication connection with the network access device 200 by using a radio frequency module (including a radio frequency unit and an antenna), and performs a wired communication connection with the network access device 200 by using a wired communication module after wired transmission modules in the network routing device 100 and the network access device 200 are connected by using a corresponding wired transmission medium. Therefore, with the network structure shown in FIG. 1, concurrent transmission can be implemented between the network routing device 100 and the network access device 200 by using the wired transmission medium and a wireless transmission medium. This improves signal transmission reliability.

Figure 2:
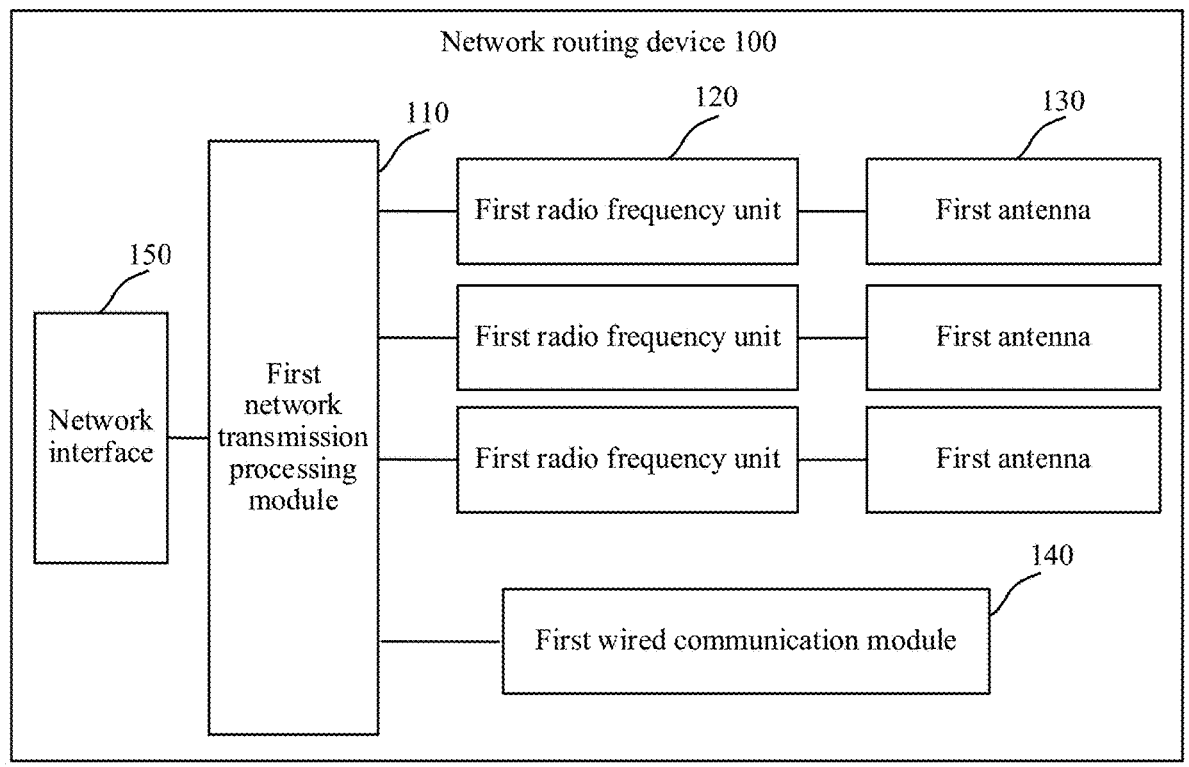
FIG. 2 is a schematic block diagram of a network routing device according to an embodiment of the present subject matter.
Figure 3:
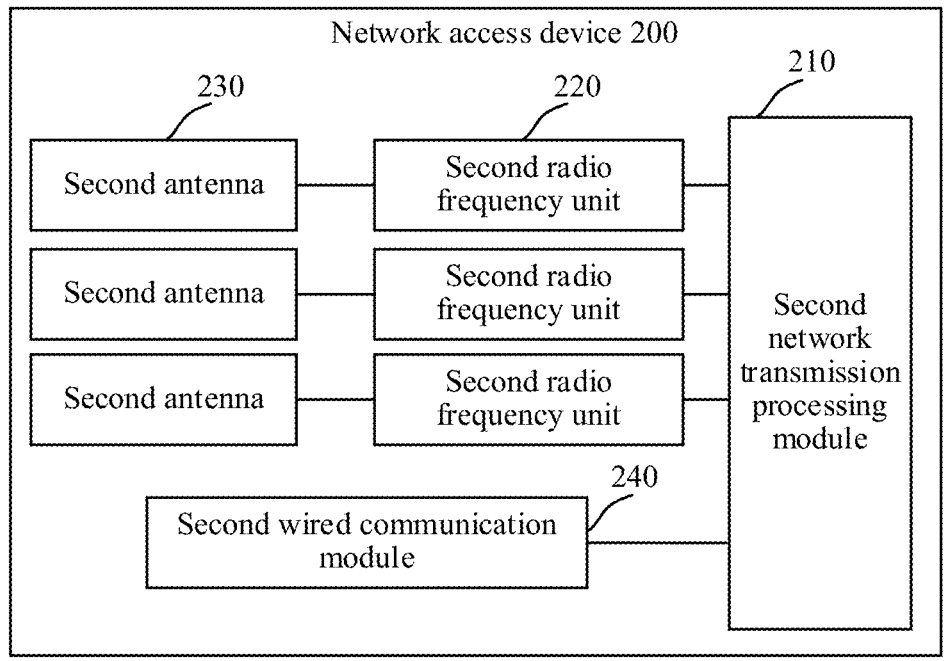
FIG. 3 is a schematic block diagram of a network access device according to an embodiment of the present subject matter.

FIG. 2 is a schematic structural block diagram of the network routing device 100 in the network architecture shown in FIG. 1 and applicable to an embodiment of the present subject matter, and FIG. 3 is a schematic block diagram of the network access device 200 in the network architecture shown in FIG. 1 and applicable to an embodiment of the present subject matter.

As shown in FIG. 2, the network routing device 100 may include a first network transmission processing module 110, three first radio frequency units 120, three first antennas 130, and one first wired communication module 140. Each first radio frequency unit 120 is connected to a corresponding first antenna 130 to form one first radio frequency module. The first network transmission processing module 110 has four first baseband signal data interfaces (not shown in the figure), and the four first baseband signal data interfaces correspond to the three first radio frequency units 120 and the first wired communication modules 140. Three of the first baseband signal data interfaces are one-to-one connected to the three first radio frequency units 120, and another first baseband signal data interface is connected to the first wired communication module 140.

As shown in FIG. 3, the network access device 200 may include a second network transmission processing module 210, three second radio frequency units 220, three second antennas 230 corresponding to the three second radio frequency units 220, and one second wired communication module 240. Each second radio frequency unit 220 is connected to a corresponding second antenna 230 to form one second radio frequency module. The second network transmission processing module 210 has four second baseband signal data interfaces (not shown in the figure), and the four second baseband signal data interfaces correspond to the three second radio frequency units 220 and the second wired communication modules 240. Three of the second baseband signal data interfaces are one-to-one connected to the three second radio frequency units 220, and the other second baseband signal data interface is connected to the second wired communication module 240.

When the network routing device 100 shown in FIG. 2 and the network access device 200 shown in FIG. 3 in the embodiments of the present subject matter are applied to the network architecture shown in FIG. 1 in the embodiments of the present subject matter, the second wired communication module 240 of the network access device 200 may be connected to the first wired communication module 140 of the network routing device 100 by using a corresponding wired transmission medium. For example, when the first wired communication module 140 and the second wired communication module 240 are power line communication modules, the first wired communication module 140 may be connected to the second wired communication module 240 by using a power line, to form a wired channel. Three second radio frequency modules of the network access device 200 are communicatively connected to three first radio frequency modules of the network routing device 100, to form three wireless channels.

It can be learned that there are four channels between the network routing device 100 and the network access device 200. When the network routing device 100 receives, through a network interface 150, a data signal that is to be sent to the network access device 200, the first network transmission processing module 110 may convert the received data signal into four baseband signals based on a preconfigured network data conversion protocol, send three of the four baseband signals to the three first radio frequency units 120, and send another baseband signal to the first wired communication module 140. Correspondingly, the first radio frequency units 120 convert the baseband signals into radio frequency signals and then send spatial streams to wireless space by using corresponding first antennas 130, and the first wired communication module 140 converts the baseband signal into a network signal that can be transmitted in the wired transmission medium and then sends the network signal to the network access device 200 by using the wired transmission medium.

After the three second antennas 230 of the network access device 200 receive the three radio frequency signals transmitted in the wireless space, the second radio frequency units 220 corresponding to the three second antennas 230 convert the radio frequency signals into baseband signals, and then send the baseband signals to the second network transmission processing module 210. The second wired communication module 240 receives the network signal that is sent by using the wired transmission medium, converts the network signal into a baseband signal, and then sends the baseband signal to the second network transmission processing module 210. By parsing the received four baseband signals, the second network transmission processing module 210 may obtain data carried in the baseband signals.

According to the network architecture shown in FIG. 1 in the embodiments of the present subject matter, concurrent network data transmission between the network routing device 100 and the network access device 200 may be implemented wirelessly and in a wired manner. Compared with transmission only in a wired or a wireless manner, this can effectively improve signal transmission reliability, and improve the robustness of an entire network transmission system.

Figure 4:
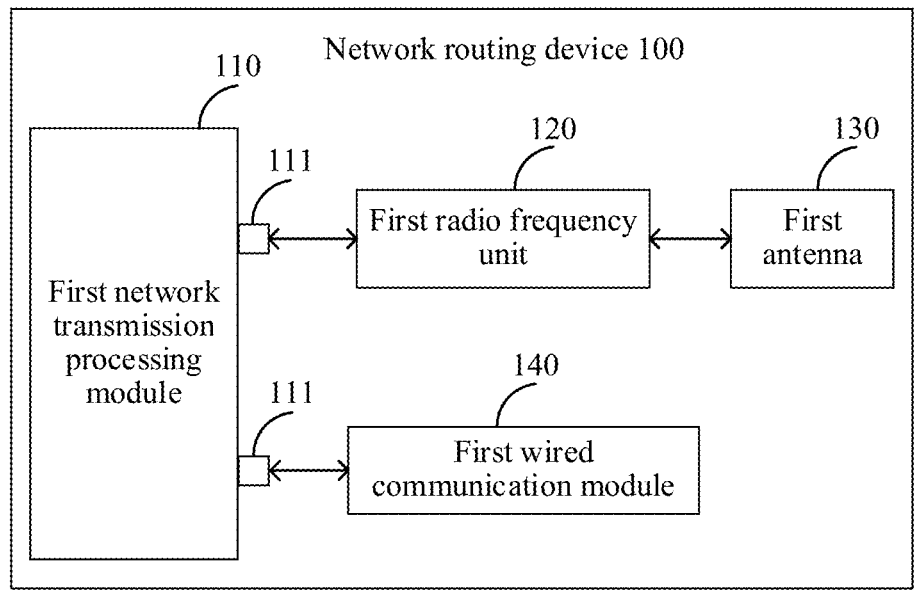
FIG. 4 is a schematic block diagram of a network routing device according to another embodiment of the present subject matter.

FIG. 4 is a schematic block diagram of a network routing device 100 according to an embodiment of the present subject matter. As shown in FIG. 4, the network routing device 100 may mainly include a first network transmission processing module 110, at least one first radio frequency unit 120 (only one first radio frequency unit 120 is shown in the figure), a first antenna 130 corresponding to the first radio frequency unit 120 in number, and at least one first wired communication module 140 (only one first wired communication module 140 is shown in the figure). The first network transmission processing module 110 has at least two first baseband signal data interfaces 111. One first baseband signal data interface 111 is connected to one end of the first radio frequency unit 120, the other end of the first radio frequency unit 120 is connected to the first antenna 130, and another first baseband signal data interface 111 is connected to the first wired communication module 140.

It should be noted that the actual number of first baseband signal data interfaces 111 is to be no less than (usually equal to) a sum of the number of first radio frequency units 120 and the number of first wired communication modules 140. Each first radio frequency unit 120 corresponds to one first baseband signal data interface 111, and each first wired communication module 140 corresponds to one first baseband signal data interface 111.

In this embodiment of the present subject matter, the first network transmission processing module 110 is configured to: convert a received data signal into at least two baseband signals, send one baseband signal to the first radio frequency unit 120 through the first baseband signal data interface 111, and send another baseband signal to the first wired communication module 140 through the first baseband signal data interface 111.

The first radio frequency unit 120 is configured to: convert the baseband signal sent by the first network transmission processing module 110 into a radio frequency signal, and then send the radio frequency signal by using the first antenna 130.

The first wired communication module 140 is configured to: be connected to a wired transmission medium, convert the baseband signal sent by the first network transmission processing module 110 into a network signal that can be transmitted in the wired transmission medium, and then send the network signal to the wired transmission medium for transmission.

By using the network routing device 100 in this embodiment of the present subject matter, the network access device 200 (which may be specifically implemented as a smart television, a computer, a network set-top box, or the like) may access a network in a radio frequency transmission manner and a wired transmission manner. When the network routing device 100 is to send a received data signal that carries data to the network access device, the network routing device 100 converts the data signal into a corresponding number of baseband signals based on the number of first radio frequency units 120 and the number of first wired communication modules 140, that is, the number of transmission channels supported by the network routing device 100. Then the network routing device 100 sends the baseband signals to the first radio frequency unit 120 and the first wired communication module 140, so that the signals are sent in both a wireless manner and a wired manner. Therefore, the network access device 200 can receive the data over channels corresponding to two transmission media. This improves network transmission reliability.

It should be noted that, in an embodiment of the present subject matter, when the network routing device 100 converts the received data signal into at least two baseband signals, the at least two baseband signals may be baseband signals carrying different data, to improve data transmission efficiency. After receiving the at least two baseband signals in a wired manner and wirelessly, the network access device 200 obtains the different data through parsing.

In another embodiment of the present subject matter, the at least two baseband signals may alternatively be the same. To be specific, the network routing device 100 may send, in both the wired manner and the wireless manner, signals carrying the same data. Therefore, despite a failure of transmitting the signal in one transmission manner, the network access device 200 can receive the signal in the other transmission manner. Certainly, in actual application, when the at least two baseband signals are the same and the network access device 200 receives the signals in both of the two transmission manners, only the signal transmitted in one of the transmission manners is further parsed according to a preconfigured signal parsing rule or by determining the quality of transmission channels corresponding to the different transmission manners.

It may be understood that a specific signal type of the data signal is determined based on a source of a signal that is received by the first network transmission processing module 110 through a network interface. For example, if the network interface is an Ethernet data interface, the data signal is an Ethernet signal.

Certainly, in actual application, the network access device 200 may be connected to the network routing device 100 by using only the wired transmission medium or only in a wireless manner based on a requirement of a user in the actual application. For example, when the quality of a radio signal is relatively poor, only the wired manner may be used to access the wireless routing device 100, to improve data transmission quality. For another example, an access manner may be further selected based on a type of network access device.

It should be noted that, in this embodiment of the present subject matter, the number of baseband signals that are to be converted from the received data signal by the first network transmission processing module 110 is specifically determined based on the the number of first radio frequency units 120 and the number of first wired communication modules 140. The number of baseband signals obtained after conversion is not greater than the sum of the number of first radio frequency units 120 and the number of first wired communication modules 140. Correspondingly, that the sending one baseband signal to the first radio frequency unit 120 through the first baseband signal data interface 111 refers to sending one baseband signal to each first radio frequency unit. If there are two first radio frequency units 120, two baseband signals are sent to the two first radio frequency units 120. Correspondingly, that the sending another baseband signal to the first wired communication module 140 through the first baseband signal data interface 111 refers to sending one baseband signal to each first wired communication module 140. If there are two first wired communication modules 140, two baseband signals are sent to the two first wired communication modules 140.

In an optional embodiment in the present subject matter, the first radio frequency unit 120 is further configured to: convert a radio frequency signal that is received by using the first antenna 130 into a baseband signal, and then send the baseband signal to the first network transmission processing module 110 through the first baseband signal data interface 111.

The first wired communication module 140 is further configured to: convert a network signal from the wired transmission medium into a baseband signal, and then send the baseband signal to the first network transmission processing module 110 through the first baseband signal data interface 111.

The first network transmission processing module 110 is further configured to: receive the baseband signal sent by the first radio frequency unit 120, receive the baseband signal sent by the first wired communication module 140, convert the received at least two baseband signals into a data signal, and then send the data signal.

In this embodiment of the present subject matter, the network routing device 100 may further receive, in both the radio frequency transmission manner and the wired transmission manner, a plurality of signals sent by the network access device 200. This implements bidirectional signal transmission between the network routing device 100 and the network access device 200 in a wired manner and the wireless manner.

In an optional embodiment of the present subject matter, the first wired communication module 140 may include at least one type of the following: a power line communication module, a coaxial cable communication module, a telephone line communication module, a twisted pair communication module, and an optical fiber communication module.

It may be understood that a different type of first wired communication module 140 also corresponds to a different type of wired transmission medium. For example, a corresponding wired transmission medium of the power line communication module is a power line, and a corresponding wired transmission medium of the coaxial cable communication module is a coaxial cable.

Figure 5:
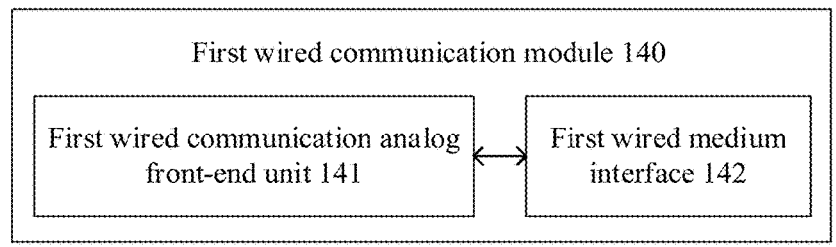
FIG. 5 is a schematic block diagram of a first wired communication module according to an embodiment of the present subject matter.

FIG. 5 is a schematic structural block diagram of the first wired communication module 140 according to an optional embodiment of the present subject matter. As shown in FIG. 5, the first wired communication module 140 may include a first wired communication analog front-end unit 141 and a first wired medium interface 142, one end of the first wired communication analog front-end unit 141 is connected to the first baseband signal data interface 111, and the other end of the first wired communication analog front-end unit 141 is connected to the first wired medium interface 142.

The first wired communication analog front-end unit 141 is configured to: convert a baseband signal sent by the first network transmission processing module 110 into a network signal that can be transmitted in the wired transmission medium, and then send the network signal to the first wired medium interface 142.

The first wired medium interface 142 is configured to: be connected to the wired transmission medium, and then transmit, to the wired transmission medium, the network signal sent by the first wired communication analog front-end unit 141.

In this embodiment of the present subject matter, the first wired communication analog front-end unit 141 is configured to convert a signal that is transmitted between the network routing device 100 and the wired transmission medium. When receiving the baseband signal sent by the first network transmission processing module 110, the first wired communication analog front-end unit 141 converts, according to a preconfigured signal processing rule, the baseband signal into the network signal that can be transmitted in the wired transmission medium.

It may be understood that a specific network signal into which the baseband signal is converted depends on types of the first wired communication module 140 and the wired transmission medium. For example, the first wired communication analog front-end unit 141 is a power line communication analog front-end unit. In this case, a corresponding wired transmission medium is the power line, and the power line communication analog front-end unit is configured to convert the baseband signal into a network signal that can be transmitted on the power line.

Figure 6:
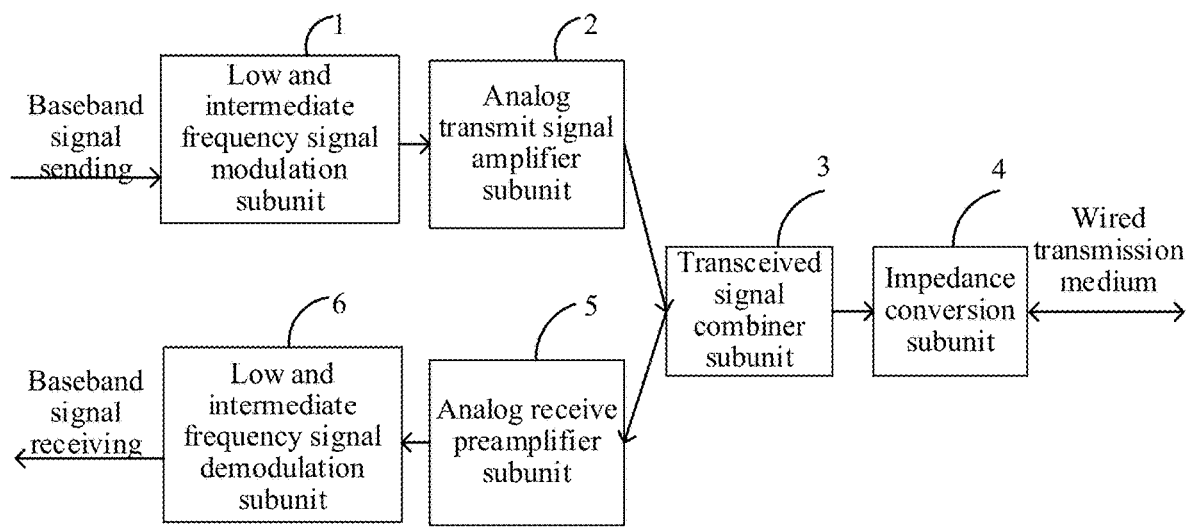
FIG. 6 is a schematic block diagram of a first wired communication analog front-end unit according to an embodiment of the present subject matter.

FIG. 6 is an implementation of the first wired communication analog front-end unit 141 according to an embodiment of the present subject matter. As shown in FIG. 6, generally, the first wired communication analog front-end unit 141 may include a low and intermediate frequency signal modulation subunit 1, an analog transmit signal amplifier subunit 2, a transceived signal combiner subunit 3, an impedance conversion subunit 4, an analog receive preamplifier subunit 5, and a low and intermediate frequency signal demodulation subunit 6. The low and intermediate frequency signal modulation subunit 1, the analog transmit signal amplifier subunit 2, the transceived signal combiner subunit 3, and the impedance conversion subunit 4 form a transmit path of the first wired communication analog front-end unit 141. The impedance conversion subunit 4, the transceived signal combiner subunit 3, the analog receive preamplifier subunit 5, and the low and intermediate frequency signal demodulation subunit 6 form a receive path of the first wired communication analog front-end unit 141.

The low and intermediate frequency signal modulation subunit 1 is configured to modulate, according to a preconfigured signal modulation rule, the baseband signal sent by the first network transmission processing module 110 into a low-frequency signal or an intermediate frequency signal, and send the low-frequency signal or the intermediate frequency signal to the analog transmit signal amplifier subunit 2.

The analog transmit signal amplifier subunit 2 is configured to: amplify the low-frequency signal or the intermediate frequency signal sent by the low and intermediate frequency signal modulation subunit 1, and send the amplified signal to the transceived signal combiner subunit.

The transceived signal combiner subunit 3 is configured to: combine a transmitted signal and a received signal, and send a signal obtained after combination to a wired transmission path.

The impedance conversion subunit 4 is configured to implement impedance matching between the first wired communication analog front-end unit 141 and the wired transmission medium.

The analog receive preamplifier subunit 5 is configured to amplify a network signal received from the wired transmission medium.

The low and intermediate frequency signal demodulation subunit 6 is configured to: demodulate an amplified low-frequency signal or intermediate frequency signal sent by the analog receive preamplifier subunit 5 into a baseband signal, and send the baseband signal to the first network transmission processing module 110.

It should be noted that, for a person skilled in the art, a specific implementation of the first wired communication analog front-end unit 141 is clear. For the same type of first wired communication module 140, specific implementation forms of the first wired communication analog front-end unit 141 thereof may also be diversified. FIG. 6 is merely a form of the first wired communication analog front-end unit 141 according to an optional embodiment of the present subject matter. In actual application, specific implementation of the first wired communication analog front-end unit 141 may be correspondingly adjusted based on an actual requirement. For example, based on an actual requirement, a unit may be added to or removed from the units shown in FIG. 6, or the units shown in FIG. 6 may be replaced by other units.

In an optional embodiment of the present subject matter, the first wired medium interface 142 is further configured to transmit a network signal from the wired transmission medium to the first wired communication analog front-end unit 141.

The first wired communication analog front-end unit 141 is further configured to: convert the network signal from the first wired medium interface 142 into a baseband signal, and then send the baseband signal to the first network transmission processing module 110.

Figure 7:
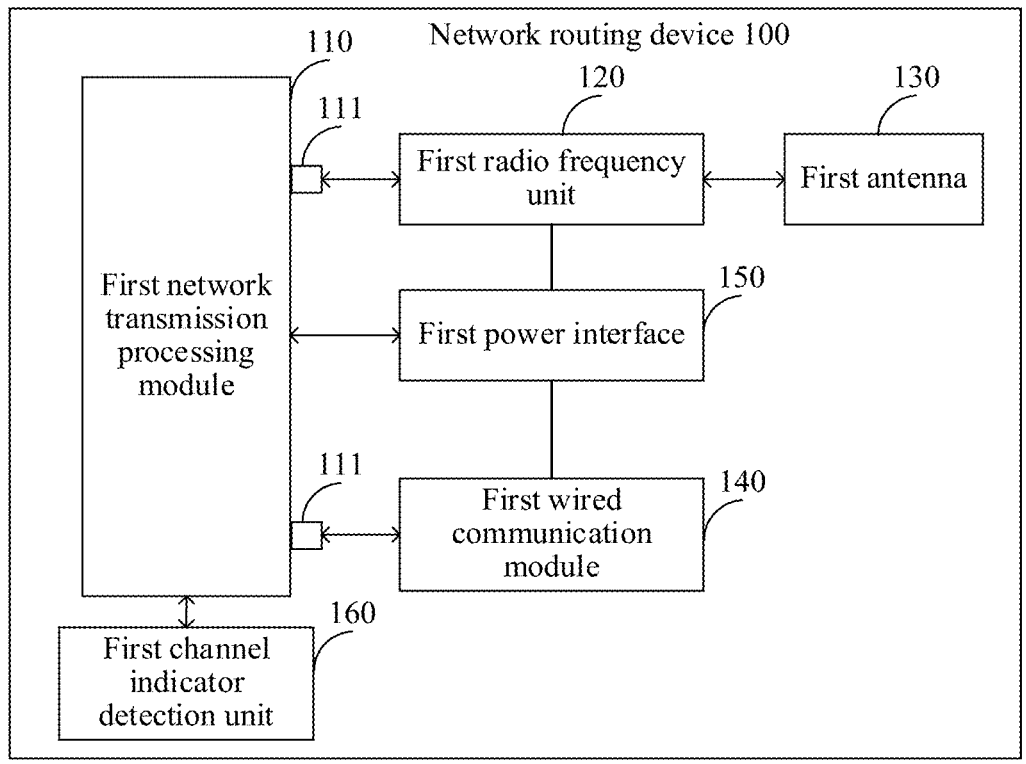
FIG. 7 is a schematic block diagram of a network routing device according to still another embodiment of the present subject matter.

As shown in FIG. 7, in an optional embodiment of the present subject matter, the network routing device 100 further includes a first power interface 150 that is connected to the first network transmission processing module 110 and the first wired communication module 140.

The first power interface 150 is connected to a power supply by using a power cable, and is used to supply working power to each unit and each module of the network routing device 100.

In an optional embodiment of the present subject matter, if the first wired communication module 140 is a power line communication module, the first wired medium interface 142 may be connected to a power line of the first power interface 150.

When the network routing device 100 is started for use, the first power interface 150 is to be connected to an inherent power line system, to supply power to each unit and each module of the network routing device 100. Therefore, the first wired medium interface 142 of the power line communication module may be directly connected to the power line of the first power interface 150. When the network routing device 100 is powered on and started, the network routing device 100 is connected to the power line, to form a power line transmission network. In this case, a network access device that supports power line communication can access a network simply through a connection to the inherent power line system using a power socket.

It may be understood that, for a person skilled in the art, a specific manner used to connect the power line communication module to the power line of the first power interface 150 is clear, and details are not described herein.

In an optional embodiment of the present subject matter, when the first power interface 150 is a three-phase power interface, there may be two power line communication modules. The first wired medium interface 142 of one of the power line communication modules is connected to a live wire of the power line of the first power interface 150 and an earth wire of the power line of the first power interface 150. The first wired medium interface 142 of the other power line communication module is connected to a neutral wire of the power line of the first power interface 150 and the earth wire of the power line of the first power interface 150.

This solution is applicable to a scenario in which the power cable uses a structure of the neutral wire, the live wire, and the earth wire. Three power lines may be all used to transmit two network signals. This solution increases the total bandwidth of the power line and is especially applicable to a scenario in which cable quality of the power line is good and network noise of the power line is relatively low.

As shown in FIG. 7, in an optional embodiment of the present subject matter, the network routing device 100 further includes a first channel indicator detection unit 160 that is connected to the first network transmission processing module 110.

The first channel indicator detection unit 160 is configured to: detect a first channel indicator of a wireless channel corresponding to the first radio frequency unit 120, detect a second channel indicator of a wired channel corresponding to the first wired communication module 140, and send a detection result to the first network transmission processing module 110.

The first network transmission processing module 110 is further configured to determine, before converting the received data signal into the at least two baseband signals, that both the first channel indicator and the second channel indicator meet a preset channel indicator condition.

In this embodiment of the present subject matter, the first network transmission processing module 110 detects a channel indicator of the wired channel and a channel indicator of the wireless channel, and sends data in both a wired manner and a wireless manner only when both the channel indicator of the wired channel and the channel indicator of the wireless channel meet the channel indicator condition. This further ensures signal transmission quality.

In an optional embodiment of the present subject matter, each of the first channel indicator and the second channel indicator may include at least one of the following channel indicators: a packet loss ratio, a signal-to-noise ratio, and external interference intensity and interference duration.

It may be understood that the first channel indicator and the second channel indicator may be the same indicators. For example, both the first channel indicator and the second channel indicator refer to the packet loss ratio. The first channel indicator and the second channel indicator may alternatively be different indicators. For example, the first channel indicator is the packet loss ratio and the second channel indicator is the signal-to-noise ratio. The external interference intensity refers to the strength at which a local channel is interfered by another channel, and the interference duration refers to duration in which the local channel is continuously interfered by the other channel.

It should be noted that specific implementations of a channel packet loss ratio, a channel signal-to-noise ratio, and channel external interference intensity and interference duration are clear to a person skilled in the art. For example, the external interference intensity and the interference duration are obtained by collecting signal power by using an idle timeslot on a channel.

In an optional embodiment of the present subject matter, the first network transmission processing module 110 is further configured to: when both the first channel indicator and the second channel indicator do not meet the channel indicator condition, determine, based on the first channel indicator and the second channel indicator, that a signal is sent by using the first radio frequency unit 120 or the first wired communication module 140; and convert the received data signal into a corresponding number of baseband signals based on a determined number of channels corresponding to the first radio frequency unit 120 and then send, to the first radio frequency unit 120 through the first baseband signal data interface 111, the baseband signals obtained after conversion, or convert the received data signal into a corresponding number of baseband signals based on a determined number of channels corresponding to the first wired communication module 140 and then send, to the first wired communication module 140 through the first baseband signal data interface 111, the baseband signals obtained after conversion.

In this embodiment of the present subject matter, when the first channel indicator of the wireless channel that corresponds to the first radio frequency unit 120 and the first antenna 130 and/or the second channel indicator of the wired channel that corresponds to the first wired communication module 140 do/does not meet the channel indicator condition, a channel used for signal transmission is determined based on the first channel indicator and the second channel indicator.

It may be understood that to determine a channel used for signal transmission based on the first channel indicator and the second channel indicator is to select a channel with relatively good channel quality for data transmission. A specific selection manner may be set based on an actual requirement. For example, the channel quality may be evaluated based on a preset channel selection condition, the first channel indicator, and the second channel indicator. For another example, when both the first channel indicator and the second channel indicator are the same indicators, the channel with relatively good channel quality may be directly selected by comparing the first channel indicator and the second channel indicator.

In an optional embodiment of the present subject matter, the first network transmission processing module 110 is specifically configured to: convert a data signal that carries first-type data and that is in the received data signal into at least one baseband signal, convert a data signal that carries second-type data and that is in the received data signal into at least one baseband signal, send a baseband signal corresponding to the first-type data to the first radio frequency unit 120 through the first baseband signal data interface 111, and send a baseband signal corresponding to the second-type data to the first wired communication module 140 through the first baseband signal data interface 111.

The first-type data and the second-type data may be set based on an actual application requirement. For example, the second-type data is video data.

In this embodiment of the present subject matter, whether a signal is sent in the wired manner or the wireless manner may be determined based on a type of data that is to be transmitted. This can better meet an actual application requirement. For example, data that requires high transmission bandwidth and high quality of service (QoS) and that is of a service, such as a 4K video or an online game, may be carried on a wired data stream, to improve data transmission reliability.

In an optional embodiment in the present subject matter, the at least two baseband signals converted by the first network transmission processing module 110 from the received data signal are multiple-input multiple-output (MIMO) modulation signals.

In this embodiment of the present subject matter, if the first network transmission processing module 110 outputs a plurality of signals, the first network transmission data processing module 110 may perform MIMO coding, multiplexing, and modulation on the received data signal, generate a plurality of baseband signals, and then send the plurality of baseband signals to the first radio frequency unit 120 and/or the first wired communication module 140, to improve signal transmission efficiency.

In an optional embodiment of the present subject matter, the first network transmission processing module 110 may include a Wi-Fi chip.

To be specific, the first network transmission processing module 110 in this embodiment of the present subject matter may be specifically implemented as the Wi-Fi chip and a necessary peripheral circuit of the Wi-Fi chip.

Figure 8:
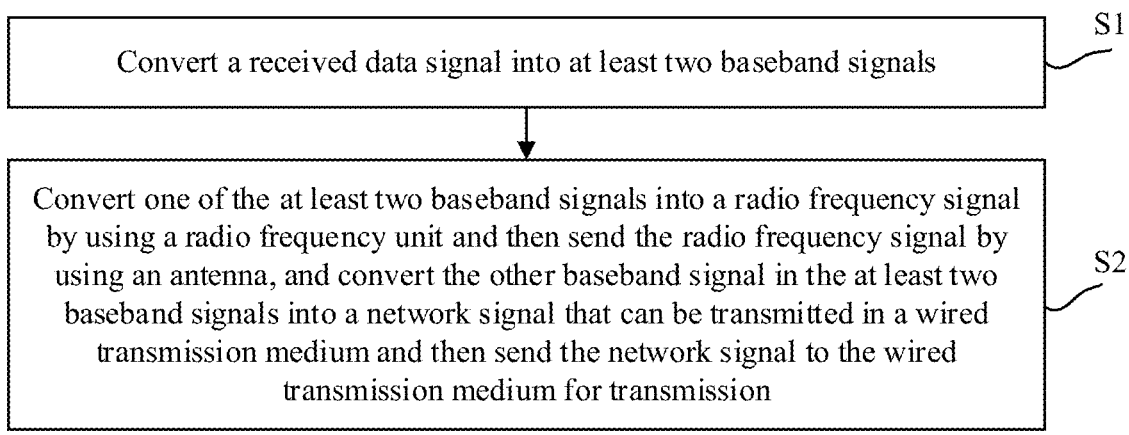
FIG. 8 is a schematic flowchart of a network data transmission method according to an embodiment of the present subject matter.

Corresponding to the network routing device provided in this embodiment of the present subject matter, an embodiment of the present subject matter further provides a network data transmission method. FIG. 8 is a schematic flowchart of a network data transmission method according to an embodiment of the present subject matter. The transmission method is applicable to the network routing device in the embodiments of the present subject matter, and is executed by a network routing device 100. As shown in FIG. 8, the network data transmission method may mainly include the following steps:

Step S1: Convert a received data signal into at least two baseband signals.

Step S2: Convert one of the at least two baseband signals into a radio frequency signal by using a first radio frequency unit and then send the radio frequency signal by using a first antenna, and convert another baseband signal in the at least two baseband signals into a network signal that can be transmitted in a wired transmission medium and then send the network signal to the wired transmission medium for transmission.

In this embodiment of the present subject matter, a first wired communication module 140 of the network routing device 100 is connected to a second wired communication module 240 of a network access device 200 by using a wired transmission medium, to form a wired channel. A first radio frequency module of the network routing device 100 establishes a wireless connection with a second radio frequency module of the network access device 200, to form a wireless channel. When receiving a data signal that is to be sent to the network access device 200, the network routing device 100 converts the data signal into a plurality of baseband signals that correspond to wired channels and wireless channels in number, and then concurrently transmits the plurality of baseband signals to the network access device 200 by using the wired channels and the wireless channels. This implements concurrent transmission of a signal in a wired medium and a wireless medium and improves signal transmission reliability.

In an optional embodiment of the present subject matter, the network data transmission method may further includes:

receiving a radio frequency signal by using the first antenna, and converting the received radio frequency signal into a baseband signal by using the first radio frequency unit;

receiving a network signal from the wired transmission medium, and converting the received network signal into a baseband signal; and converting the received at least two baseband signals into a data signal, and then sending the data signal.

In this embodiment of the present subject matter, the network routing device 100 may receive, through both the wired channel and the wireless channel, signals transmitted by the network access device 200. This implements bidirectional data exchange between the network routing device 100 and the network access device 200.

In an optional embodiment of the present subject matter, before the converting a received data signal into at least two baseband signals, the transmission method further includes:

detecting a first channel indicator of the wireless channel corresponding to the first radio frequency unit;

detecting a second channel indicator of the wired channel corresponding to the wired transmission medium; and determining that both the first channel indicator and the second channel indicator meet a preset channel indicator condition.

In an optional embodiment of the present subject matter, the first channel indicator and the second channel indicator each includes at least one of the following channel indicators:

a packet loss ratio, a signal-to-noise ratio, and external interference intensity and interference duration.

In an optional embodiment of the present subject matter, if both the first channel indicator and the second channel indicator do not meet the channel indicator condition, the transmission method further includes:

determining, based on the first channel indicator and the second channel indicator, that a signal is sent by using the first radio frequency unit or the wired transmission medium; and converting the received data signal into a corresponding number of baseband signals based on a number of channels corresponding to the first radio frequency unit or a number of channels corresponding to the wired transmission medium, and then sending, by using the first radio frequency unit or the wired transmission medium, the baseband signals obtained after conversion.

In an optional embodiment of the present subject matter, the converting a received data signal into at least two baseband signals includes:

converting a data signal that carries first-type data and that is in the received data signal into at least one baseband signal; and converting a data signal that carries second-type data and that is in the received data signal into at least one baseband signal.

The converting one of the at least two baseband signals into a radio frequency signal by using a first radio frequency unit and then sending the radio frequency signal by using a first antenna includes:

converting a baseband signal corresponding to the first-type data into the radio frequency signal by using the first radio frequency unit, and then sending the radio frequency signal by using the first antenna.

The converting another baseband signal in the at least two baseband signals into a network signal that can be transmitted in a wired transmission medium, and then sending the network signal to the wired transmission medium for transmission includes:

converting a baseband signal corresponding to the second-type data into the network signal that can be transmitted in the wired transmission medium, and then sending the network signal to the wired transmission medium for transmission.

It may be understood that, for specific details of the steps of the network data transmission method in this embodiment of the present subject matter, refer to related detailed descriptions of corresponding parts in the embodiments shown in FIG. 1 to FIG. 7 in the present subject matter. Details are not described herein again.

Figure 9:
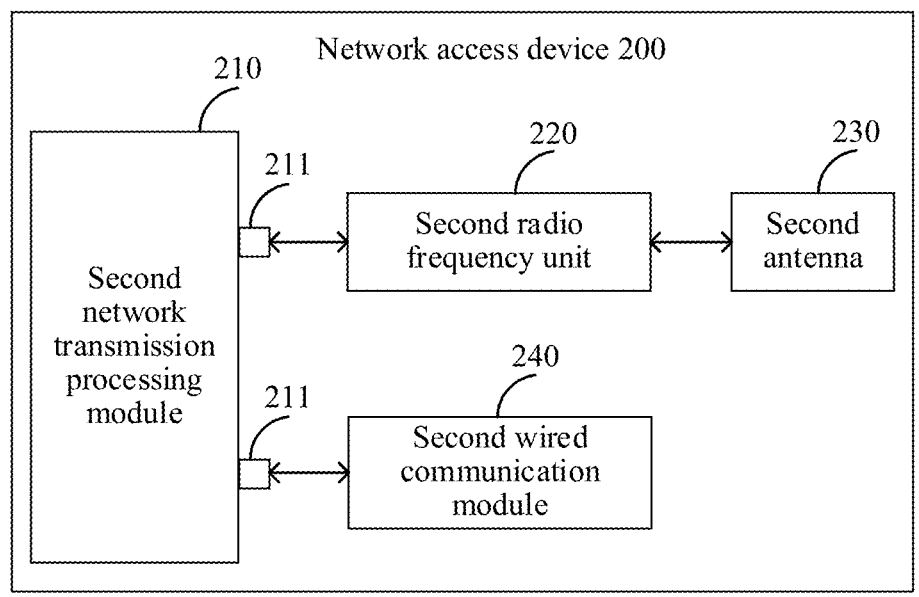
FIG. 9 is a schematic block diagram of a network access device according to another embodiment of the present subject matter.

FIG. 9 is a schematic diagram of receiving performed by a network access device 200 according to another embodiment of the present subject matter. The network access device 200 can access a network by using the network routing device 100 provided in the embodiments of the present subject matter. As shown in FIG. 9, the network access device includes a second network transmission processing module 210, at least one second radio frequency unit 220, a second antenna 230 corresponding to the second radio frequency unit 220 in number, and at least one second wired communication module 240. The second network transmission processing module 240 has at least two second baseband signal data interfaces 211, one second baseband signal data interface 211 is connected to one end of the second radio frequency unit 220, the other end of the second radio frequency unit 220 is connected to the second antenna 230, and another second baseband signal data interface 211 is connected to the second wired communication module 240.

The second radio frequency unit 220 is configured to: convert a radio frequency signal that is received by using the second antenna 230 into a baseband signal, and then send the baseband signal to the second network transmission processing module 210 through the second baseband signal data interface 211.

The second wired communication module 240 is configured to: be connected to a wired transmission medium, convert a network signal that is received from the wired transmission medium into a baseband signal, and then send the baseband signal to the second network transmission processing module 210 through the second baseband signal data interface 211.

The second network transmission processing module 210 is configured to: receive, through the second baseband signal data interface 211, the baseband signal sent by the second radio frequency unit 220, receive the baseband signal sent by the second wired communication module 240, parse the received baseband signals, and then obtain data carried in the baseband signals.

In this embodiment of the present subject matter, the network access device 200 can implement a communication connection to the network routing device 100 in both a wired manner and a wireless manner, and receive, through both a wired channel and a wireless channel, data transmitted by the network routing device 100.

In an optional embodiment of the present subject matter, the second network transmission processing module 210 is further configured to: generate at least two baseband signals based on to-be-sent data, send one baseband signal to the second radio frequency unit 220 through the second baseband signal data interface 211, and send another baseband signal to the second wired communication module 240 through the second baseband signal data interface 211.

The second radio frequency unit 220 is further configured to: convert the baseband signal sent by the second network transmission processing module 210 into a radio frequency signal, and then send the radio frequency signal by using the second antenna 230.

The second wired communication module 240 is further configured to: convert the baseband signal sent by the second network transmission processing module 210 into a network signal that can be transmitted in the wired transmission medium, and then send the network signal to the wired transmission medium for transmission.

Corresponding to the first wired communication module 140 of the network routing device 100, in an optional embodiment of the present subject matter, the second wired communication module 240 includes at least one of the following communication modules:

a power line communication module, a coaxial cable communication module, a telephone line communication module, a twisted pair communication module, and an optical fiber communication module.

It may be understood that, in actual application, when the network access device 200 accesses a network by using the network routing device 100, the second wired communication module 240 of the network access device 200 correspondingly matches the first wired communication module 140 of the network routing device 100. The wired transmission medium configured to connect the second wired communication module 240 to the first wired communication module 140 is also of corresponding type. For example, both the first wired communication module 140 and the second wired communication module 240 may be power line communication modules, and a corresponding wired transmission medium is a power line.

In an optional embodiment of the present subject matter, the second wired communication module 240 includes a second wired communication analog front-end unit and a second wired medium interface, one end of the second wired communication analog front-end unit is connected to the second baseband signal data interface, and the other end of the second wired communication analog front-end unit is connected to the second wired medium interface.

The second wired communication analog front-end unit is configured to: convert the network signal from the second wired medium interface into a baseband signal, and then send the baseband signal to the second network transmission processing module.

The second wired medium interface is configured to be connected to the wired transmission medium and send a network signal from the wired transmission medium to the second wired communication analog front-end unit.

In an optional embodiment of the present subject matter, the second wired communication analog front-end unit is further configured to: convert a baseband signal sent by the second network transmission processing module 210 into a network signal that can be transmitted in the wired transmission medium, and then send the network signal to the second wired medium interface.

The second wired medium interface is further configured to transmit, to the wired transmission medium for transmission, the network signal sent by the second wired communication analog front-end unit.

In an optional embodiment of the present subject matter, the network routing device 200 further includes a second power interface that is connected to the second network transmission processing module 210 and the second wired communication module 230.

In an optional embodiment of the present subject matter, if the second wired communication module 240 is the power line communication module, the second wired medium interface is connected to a power line of the second power interface.

In an optional embodiment of the present subject matter, when the second power interface is a three-phase power interface, there may be two power line communication modules. The second wired medium interface of one of the power line communication modules is connected to a live wire of the power line of the second power interface and an earth wire of the power line of the second power interface. The second wired medium interface of the other power line communication module is connected to a neutral wire of the power line of the second power interface and the earth wire of the power line of the second power interface.

In an optional embodiment of the present subject matter, the network access device 200 may further include a second channel indicator detection unit that is connected to the second network transmission processing module 240.

The second channel indicator detection unit is configured to: detect a third channel indicator of a wireless channel corresponding to the second radio frequency unit 220, detect a fourth channel indicator of a wired channel corresponding to the second wired communication module 240, and send a detection result to the second network transmission processing module 210.

The second network transmission processing module 210 is further configured to determine, before generating the at least two baseband signals based on the to-be-sent data, that both the third channel indicator and the fourth channel indicator meet a preset channel indicator condition.

In an optional embodiment of the present subject matter, the second network transmission processing module 210 is further configured to: when both the third channel indicator and the fourth channel indicator do not meet the channel indicator condition, determine, based on the third channel indicator and the fourth channel indicator, that a signal is sent by using the second radio frequency unit 220 or the second wired communication module 240; and convert the to-be-sent data signal into a corresponding number of baseband signals based on a determined number of channels corresponding to the second radio frequency unit 220 and then send, to the second radio frequency unit 220 through the second baseband signal data interface 211, the baseband signals obtained after conversion, or convert the to-be-sent data signal into a corresponding number of baseband signals based on a determined number of channels corresponding to the second wired communication module 240 and then send, to the second wired communication module 240 through the second baseband signal data interface 211, the baseband signals obtained after conversion.

In an optional embodiment of the present subject matter, each of the third channel indicator and the fourth channel indicator may include at least one of the following channel indicators: a packet loss ratio, a signal-to-noise ratio, and external interference intensity and interference duration.

In an optional embodiment of the present subject matter, the second network transmission processing module 210 is specifically configured to: generate at least one baseband signal based on third-type data in the to-be-sent data, generate at least one baseband signal based on fourth-type data in the to-be-sent data, send, to the second radio frequency unit 220 through the second baseband signal data interface 211, the baseband signal that carries the third-type data, and send, to the second wired communication module 240 through the second baseband signal data interface 211, the baseband signal that carries the fourth-type data.

It may be understood that the network access device 200 and the network routing device 100 in the embodiments of the present subject matter are used in a matched manner. For specific implementation and descriptions of functions of modules or units of the network access device 200 in the foregoing embodiments, refer to detailed descriptions of the modules or units of the network routing device 100 in the foregoing embodiments. Details are not described herein again.

Figure 10:
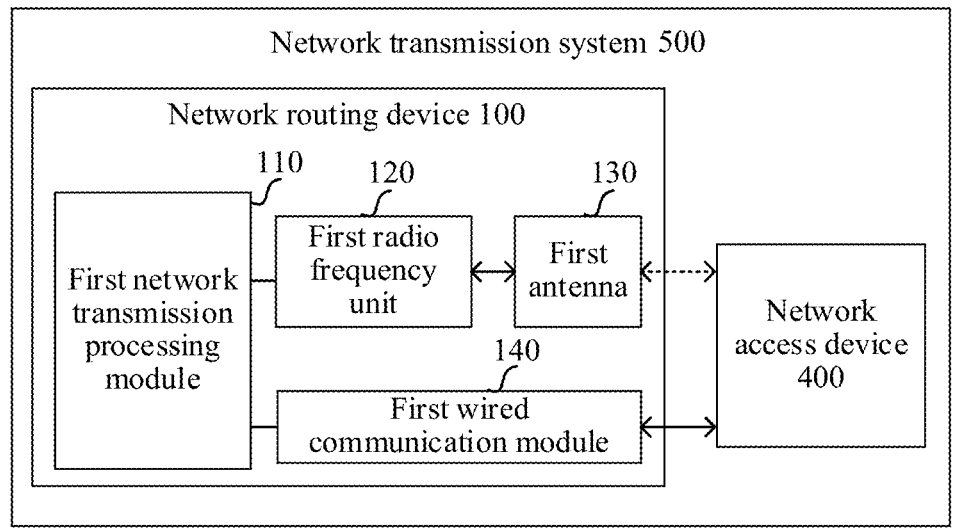
FIG. 10 is a schematic block diagram of a network transmission system according to an embodiment of the present subject matter.

FIG. 10 is a schematic block diagram of a network transmission system according to an embodiment of the present subject matter. As shown in FIG. 10, a network transmission system 500 includes the network routing device 100 in any one of the foregoing embodiments and at least one network access device 400. The network access device 400 may be a wired network access device or a wireless network access device. The network access device 400 is connected to a first wired communication module 140 of the network routing device 100 by using a wired transmission medium, or is wirelessly connected to a first radio frequency module of the network routing device 100. The first radio frequency module includes at least one first radio frequency unit 120 and a first antenna 130 corresponding to the first radio frequency unit 120 in number.

In this embodiment of the present subject matter, the network access device 400 may be a wired network access device that supports only wired access, may be a wireless network access device that supports only wireless access, or may be a device that supports both wired and wireless access modes. The network transmission system 300 in this embodiment of the present subject matter provides more options for access of the network access device 400, and better meets an actual application requirement.

It may be understood that the network access device 400 may be the network access device 200 in any one of the foregoing embodiments of the present subject matter.

Optionally, the modules and/or units of the network routing device 100 and the network access device 200 in the embodiments of the present subject matter may be integrated together or disposed separately.

It may be understood that, for the network routing device and the network access device and in the network data transmission method in the embodiments of the present subject matter, signal sending and data receiving are relative, and mutual reference may be made between descriptions of a signal sending part and content of a signal receiving part.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When computer program instructions are loaded and executed on the computer, the procedures or functions according to the embodiments of the present subject matter are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A device, comprising a first network transmission processing module, at least one first radio frequency unit, a first antenna corresponding to the first radio frequency unit in number, and at least one first wired communication module, wherein the first network transmission processing module has at least two first baseband signal data interfaces, one first baseband signal data interface is connected to one end of the first radio frequency unit, the other end of the first radio frequency unit is connected to the first antenna, and another first baseband signal data interface is connected to one of the at least one first wired communication module;

the first network transmission processing module is configured to: convert a received data signal into at least two baseband signals including a first baseband signal and a second baseband signal, send the first baseband signal to the first radio frequency unit through the first baseband signal data interface, and send the second baseband signal to the first wired communication module through the first baseband signal data interface;

the first radio frequency unit is configured to: convert the baseband signal sent by the first network transmission processing module into a radio frequency signal, and then send the radio frequency signal via the first antenna; and the first wired communication module is configured to: be connected to a wired transmission medium, convert the second baseband signal sent by the first network transmission processing module into a first network signal that is transmittable in the wired transmission medium, and then send the first network signal to the wired transmission medium for transmission.

2. The device according to claim 1, wherein the first radio frequency unit is further configured to: convert a radio frequency signal that is received by using the first antenna into a third baseband signal, and then send the third baseband signal to the first network transmission processing module through the first baseband signal data interface;

the first wired communication module is further configured to: convert a network signal from the wired transmission medium into a fourth baseband signal, and then send the fourth baseband signal to the first network transmission processing module through the first baseband signal data interface; and the first network transmission processing module is further configured to: receive the third baseband signal sent by the first radio frequency unit, receive the fourth baseband signal sent by the first wired communication module, convert the received at least two baseband signals including the third and fourth baseband signals into a data signal, and then send the data signal.

3. The device according to claim 1, wherein the first wired communication module comprises at least one of the following communication modules:

a power line communication module, a coaxial cable communication module, a telephone line communication module, a twisted pair communication module, and an optical fiber communication module.

4. The device according to claim 1, wherein the first wired communication module comprises a first wired communication analog front-end unit and a first wired medium interface, one end of the first wired communication analog front-end unit is connected to the first baseband signal data interface, and the other end of the second wired communication analog front-end unit is connected to the first wired medium interface;
the first wired communication analog front-end unit is configured to: convert the second baseband signal sent by the first network transmission processing module into the first network signal that is transmittable in the wired transmission medium, and then send the first network signal to the first wired medium interface; and
the first wired medium interface is configured to: be connected to the wired transmission medium, and then transmit, to the wired transmission medium, the first network signal sent by the first wired communication analog front-end unit.

5. The device according to claim 4, wherein
the first wired medium interface is further configured to transmit a second network signal from the wired transmission medium to the first wired communication analog front-end unit; and
the first wired communication analog front-end unit is further configured to: convert the second network signal from the first wired medium interface into a fourth baseband signal, and then send the fourth baseband signal to the first network transmission processing module.

6. The device according to claim 4, wherein the network routing device further comprises a first power interface that is connected to the first network transmission processing module and the first wired communication module; and
if the first wired communication module is a power line communication module, the first wired medium interface is connected to a power line of the first power interface.

7. The device according to claim 6, wherein the first power interface is a three-phase power interface, there are two power line communication modules, the first wired medium interface of one of the power line communication modules is connected to a live wire of the power line of the first power interface and an earth wire of the power line of the first power interface, and the first wired medium interface of the other power line communication module is connected to a neutral wire of the power line of the first power interface and the earth wire of the power line of the first power interface.

8. The device according to claim 1, wherein the device further comprises a first channel indicator detection unit connected to the first network transmission processing module, wherein
the first channel indicator detection unit is configured to: detect a first channel indicator of a wireless channel corresponding to the first radio frequency unit, detect a second channel indicator of a wired channel corresponding to the first wired communication module, and send a detection result to the first network transmission processing module; and
the first network transmission processing module is further configured to determine, before converting the received data signal into the at least two baseband signals, that both the first channel indicator and the second channel indicator meet a preset channel indicator condition.

9. The device according to claim 8, wherein
the first network transmission processing module is further configured to: when both the first channel indicator and the second channel indicator do not meet the channel indicator condition, determine, based on the first channel indicator and the second channel indicator, that a signal is sent by using the first radio frequency unit or the first wired communication module; and convert the received data signal into a corresponding number of baseband signals based on a determined number of channels corresponding to the first radio frequency unit and then send, to the first radio frequency unit through the first baseband signal data interface, the baseband signals obtained after conversion, or convert the received data signal into a corresponding number of baseband signals based on a determined quantity of channels corresponding to the first wired communication module and then send, to the first wired communication module through the first baseband signal data interface, the baseband signals obtained after conversion.

10. The device according to claim 8, wherein each of the first channel indicator and the second channel indicator comprises at least one of the following channel indicators:
a packet loss ratio, a signal-to-noise ratio, and external interference intensity and interference duration.

11. The device according to claim 1, wherein
the first network transmission processing module is specifically configured to: convert a data signal that carries first-type data and that is in the received data signal into at least one baseband signal, convert a data signal that carries second-type data and that is in the received data signal into at least one baseband signal, send a baseband signal corresponding to the first-type data to the first radio frequency unit through the first baseband signal data interface, and send a baseband signal corresponding to the second-type data to the first wired communication module through the first baseband signal data interface.

12. The device according to claim 1, wherein the at least two baseband signals converted by the first network transmission processing module from the received data signal are multiple-input multiple-output (MIMO) modulation signals.

13. A method, comprising:
converting a received data signal into at least two baseband signals;
converting one of the at least two baseband signals into a radio frequency signal by using a first radio frequency unit, and then sending the radio frequency signal by using a first antenna; and
converting another baseband signal of the at least two baseband signals into a network signal that is transmittable in a wired transmission medium, and then sending the network signal to the wired transmission medium for transmission,
wherein the converting a received data signal into at least two baseband signals comprises:
converting a data signal that carries first-type data and that is in the received data signal into at least one baseband signal; and
converting a data signal that carries second-type data and that is in the received data signal into at least one baseband signal; wherein the converting one of the at least two baseband signals into a radio frequency signal by using a first radio frequency unit, and then sending the radio frequency signal by using a first antenna comprises:
converting a baseband signal corresponding to the first-type data into the radio frequency signal by using the first radio frequency unit, and then sending the radio frequency signal by using the first antenna; wherein
the converting the other baseband signal in the at least two baseband signals into a network signal that is transmittable in a wired transmission medium, and then sending the network signal to the wired transmission medium for transmission comprises:
converting a baseband signal corresponding to the second-type data into the network signal that is transmittable in the wired transmission medium, and then sending the network signal to the wired transmission medium for transmission.

14. The method according to claim 13, wherein the transmission method further comprises:
receiving a radio frequency signal by using the first antenna, and converting the received radio frequency signal into a baseband signal by using the first radio frequency unit;
receiving a network signal from the wired transmission medium, and converting the received network signal into a baseband signal; and
converting the received at least two baseband signals into a data signal, and then sending the data signal.

15. The method according to claim 13, wherein before the converting a received data signal into at least two baseband signals, the transmission method further comprises:
detecting a first channel indicator of a wireless channel corresponding to the first radio frequency unit;
detecting a second channel indicator of a wired channel corresponding to the wired transmission medium; and
determining that both the first channel indicator and the second channel indicator meet a preset channel indicator condition.

16. The method according to claim 15, wherein when both the first channel indicator and the second channel indicator do not meet the preset channel indicator condition, the transmission method further comprises:
determining, based on the first channel indicator and the second channel indicator, that a signal is sent by using the first radio frequency unit or the wired transmission medium; and
converting the received data signal into a corresponding quantity of baseband signals based on a quantity of channels corresponding to the first radio frequency unit and then sending, by using the first radio frequency unit, the baseband signals obtained after conversion, or converting the received data signal into a corresponding quantity of baseband signals based on a quantity of channels corresponding to the wired transmission medium and then sending, by using the wired transmission medium, the baseband signals obtained after conversion.

17. A device comprising a network transmission processing module, at least one radio frequency unit, an antenna corresponding to the radio frequency unit in quantity, and at least one wired communication module, wherein
the network transmission processing module has at least two baseband signal data interfaces, one baseband signal data interface is connected to one end of the radio frequency unit, the other end of the radio frequency unit is connected to the antenna, and the other baseband signal data interface is connected to the wired communication module;
the radio frequency unit is configured to: convert a radio frequency signal that is received by using the antenna into a baseband signal, and then send the baseband signal to the network transmission processing module through the baseband signal data interface;
the wired communication module is configured to: be connected to a wired transmission medium, convert a network signal that is received from the wired transmission medium into a baseband signal, and then send the baseband signal to the network transmission processing module through the baseband signal data interface; and
the network transmission processing module is configured to: receive, through the baseband signal data interface, the baseband signal sent by the radio frequency unit, receive, through the baseband signal data interface, the baseband signal sent by the wired communication module, parse the received baseband signals, and then obtain data carried in the baseband signals.

18. The device according to claim 17, wherein the network transmission processing module is further configured to: generate at least two baseband signals based on to-be-sent data, send one baseband signal to the radio frequency unit through the baseband signal data interface, and send another baseband signal to the wired communication module through the baseband signal data interface;
the radio frequency unit is further configured to: convert the baseband signal sent by the network transmission processing module into a radio frequency signal, and then send the radio frequency signal by using the antenna; and
the wired communication module is further configured to: convert the baseband signal sent by the network transmission processing module into a network signal that is transmittable in the wired transmission medium, and then send the network signal to the wired transmission medium for transmission.

* * * * *